(12) United States Patent
Lynch

(10) Patent No.: US 12,008,429 B2
(45) Date of Patent: Jun. 11, 2024

(54) WEARABLE ASSEMBLY

(71) Applicant: Prevayl Innovations Limited, Manchester (GB)

(72) Inventor: Michael John Lynch, Cheshire (GB)

(73) Assignee: Prevayl Innovations Limited, Manchester (GB)

( * ) Notice: Subject to any disclaimer, the term of this patent is extended or adjusted under 35 U.S.C. 154(b) by 0 days.

(21) Appl. No.: 18/245,929

(22) PCT Filed: Sep. 20, 2021

(86) PCT No.: PCT/GB2021/052432
§ 371 (c)(1),
(2) Date: Mar. 20, 2023

(87) PCT Pub. No.: WO2022/058750
PCT Pub. Date: Mar. 24, 2022

(65) Prior Publication Data
US 2023/0385567 A1    Nov. 30, 2023

(30) Foreign Application Priority Data
Sep. 21, 2020   (GB) .................... 2014826

(51) Int. Cl.
*G06K 7/10* (2006.01)
*G06K 19/077* (2006.01)

(52) U.S. Cl.
CPC ... *G06K 7/10366* (2013.01); *G06K 19/07762* (2013.01)

(58) Field of Classification Search
None
See application file for complete search history.

(56) References Cited

U.S. PATENT DOCUMENTS

| 2004/0019288 A1* | 1/2004 | Kinast | A61B 5/0002 600/509 |
| 2016/0094259 A1* | 3/2016 | Hatanaka | A44C 5/0007 455/90.2 |

FOREIGN PATENT DOCUMENTS

GB    2521715    7/2015

OTHER PUBLICATIONS

International Search Report received in PCT/GB2021/052432 dated Jan. 11, 2022.
Written Opinion received in PCT/GB2021/052432 dated Jan. 11, 2022.

* cited by examiner

*Primary Examiner* — Kristy A Haupt
(74) *Attorney, Agent, or Firm* — Suzannah K. Sundby, Esq.; Canady + Lortz LLP

(57) ABSTRACT

Wearable assembly (2) comprises wearable article (200) and electronics module (300). The wearable article (200) comprises an identification element such as a length of conductive material (204). Identification information is encoded in an electrical property of the length of conductive material (204). An electronics module (300) comprises a processor and two contacts (301) communicatively coupled to the processor. The processor processes signals received from the two contacts (301). When the electronics module (300) is positioned on the wearable article such that the two contacts 301 are brought into contact with the length of the conductive material (204) and electrically connected to one another via the length conductive material (204), the processor is operable to measure an electrical property of the electrical connection formed between the two contacts (301) by the conductive material (204) so as to read the identification information.

19 Claims, 6 Drawing Sheets

WEARABLE ASSEMBLY

The present invention is directed towards a wearable assembly, electronics module, wearable article, and method, and in particular is directed towards reading identification information encoded into an identification element of the wearable article.

BACKGROUND

Wearable articles can be designed to interface with a user of the article, and to determine information such as the user's heart rate, rate of respiration, activity level, and body positioning. Such properties can be measured with a sensor assembly that includes a sensor for signal transduction and/or microprocessors for analysis. The articles include electrically conductive pathways to allow for signal transmission between an electronics module for processing and communication and sensing components of the article. The wearable articles may be garments. Such garments are commonly referred to as 'smart clothing' and may also be referred to as 'biosensing garments' if they measure biosignals.

UK Patent Publication No. 2521715 (A) discloses a communication module for personal physical performance monitoring. The module comprises means for mounting to a mounting zone on a sports item. The means for mounting comprises two or more electronic contact terminals for making an electronic contact with the sports item while being mounted thereon. The module additionally comprises a wireless communication unit for communicating with a remote monitoring device, and a processing unit functionally connected to said contact terminals and to said wireless communication unit and capable of processing data received through the contact terminals from sensors in the sports item and/or the wireless communication unit according to data processing instructions. The communication module comprises means for reading an identifier stored in a memory unit of the sports item while being mounted thereon, and the processing unit is capable of changing said data processing instructions based on the identifier read from the sports item.

It is desirable to overcome at least some of the problems associated with the prior art, whether explicitly discussed herein or otherwise.

SUMMARY

According to the present disclosure there is provided a wearable assembly, electronics module, wearable article, and method as set forth in the appended claims. Other features of the invention will be apparent from the dependent claims, and the description which follows.

According to a first aspect of the disclosure, there is provided a wearable assembly. The wearable assembly comprises a wearable article comprising an identification element. Identification information is encoded in an electrical property of identification element. The wearable assembly further comprises an electronics module comprising a processor and two contacts communicatively coupled to the processor, the processor being operable to process signals received from the two contacts. When the electronics module is positioned on the wearable article such that the two contacts are brought into contact with the identification element and electrically connected to one another via the identification element, the processor is operable to measure an electrical property of the electrical connection formed between the two contacts by the identification element so as to read the identification information.

Advantageously, the wearable article provides an identification element which has identification information encoded into an electrical property thereof. The identification element can be easily and cheaply integrated into the wearable article. The electrical property of the identification element can be easily measured by the electronics module to read the identification information. Dedicated electronic circuitry such as a memory or an RFID tag are not required in the wearable article to enable the wearable article to be identified. Instead, a simple identification element which may comprise a strip of conductive material and/or passive components such as resistors and capacitors may be provided in the wearable article. Moreover, the electronics module does not need to be configured to read a memory in the wearable article. This can simplify the construction of the electronics module.

The identification element may comprise one or more capacitors or resistors. The measured electrical property may be defined by the capacitance or resistance value.

The identification element may comprise a length of conductive material. The identification information may be encoded into an electrical property of the length of conductive material. The length of conductive material may be provided in addition to or instead of any capacitors or resistors. The measured electrical property may be defined by one or more of the width, length thickness, and resistivity of the conductive material that extends between and electrically connects the two contacts together. The identification information may be encoded by suitably selecting one or more of the width, thickness, length and resistivity of the conductive material.

The electrical property may be the impedance. Measuring the electrical property of the electrical connection formed between the two contacts by the identification element may comprise measuring the impedance between the two contacts. Measuring the impedance may comprise measuring the resistance between the two contacts. The impedance between the two contacts will is defined by one or more of the width, thickness, length and resistivity of a length of conductive material of the identification element that extends between the two contacts. While the separation of the contact regions of the electronics module is generally fixed, the length of the conductive material can still be used to encode information by, for example, allowing the length of conductive material to adopt a circuitous path rather than a straight path.

The identification element may comprise a length of conductive material. The length of conductive material may comprise a region of uninterrupted, continuous, conductive material having a length at least equal to the spacing between the two contacts of the electronics module. The region of uninterrupted, continuous, conductive material does not have any breaks in it that would interrupt an electrical connection formed between the two contacts when positioned on the region.

The length of conductive material may have a length which is greater than the length of the spacing between the contacts of the electronics module. The contacts of the electronics module may be positionable at a number of different positions along the length of the conductive material.

The identification information may identify a property of the wearable article. The property of the wearable article may refer to a type of the wearable article such as a physical category of the wearable article, a size of the wearable article, electrical components available for the wearable article, and intended use of the wearable article. The physical category of the wearable article may refer to whether the wearable article is an item of clothing or other form of wearable article (e.g. an item of jewellery, glasses, or a watch). The physical category of the wearable article may identify whether the wearable article is a top, a pair of bottoms, a t-shirt, a bra, a tank etc.

The identification information may identify a location of the identification element on the wearable article. Different locations of the wearable article may have different identification elements that identify their respective locations. For example, an identification element may be provided on the front of a garment and may have an electrical property that identifies itself as being at the front of the garment. Another identification element may be provided on the back of the garment and may have an electrical property that identifies itself as being at the rear of the garment. In this way, the electronics module is able to determine whether it is coupled to the front or rear of the garment.

The processor may be operable to compare the measured electrical property (such as the measured impedance) to one or more pre-stored values (e.g. impedance values) associated with different identification information so as to decode the identification information encoded in an electrical property of the identification element. The electronics module may thus compare the measured value with a dictionary of pre-stored values. The dictionary may be received/updated by an external device in communication with the electronics module.

The identification element may comprise a length of conductive material. The length of conductive material may comprise two connection regions separated by a bridging conductor. The spacing between the two connection regions may correspond to the spacing between the two contacts of the electronics module. The connection regions/bridging conductor may be integrally formed with one another such that the length of conductive material has a uniform structure.

The length of conductive material may comprise a conductive material that is applied to a body of the wearable article such as a textile body. The conductive material may be in the form of a conductive ink that is printed onto the body such as by using screen printing or ink jet printing techniques. The length of conductive material may be provided in the form of a transfer that is adhered to the body. The transfer may comprise one or more cured conductive ink layers that may be separated by cured non-conductive ink layers. An adhesive layer of the transfer may enable the transfer to be adhered to the body such as under the application of heat and/or pressure. The length of conductive material may be formed from a length of conductive wire.

In preferred examples, the length of conductive material comprises a conductive textile. The conductive textile may be a knitted, woven, felted or embroidered. The length of conductive material may comprise conductive yarn. The length of conductive material may be attached to the body such as by being stitched or adhered to the body. In preferred examples still, the length of conductive material is integrally formed with the textile body such as during a single knitting, weaving or felting operation. In most preferred examples, the length of conductive material is a knitted component and in particular a weft knitted component that is formed integrally with a corresponding weft knitted textile body. The length of conductive material may be knitted from a single length of conductive yarn.

The body of the wearable article may be formed of any suitable material. The body may be made from a plastic material or a textile. The body is preferred to be non-conductive or a least comprise non-conductive regions. The textile body may be made using any textile construction techniques known in the art such as knitting, weaving or felting. The textile body may comprise one or more types of yarn preferably non-conductive yarn. The textile body may comprise a base yarn and one or more additional yarns may be provided so as to add stretch to the textile body. The one or more additional yarns may be elastomeric yarns. In preferred examples, the textile body is a knitted component and in particular a weft knitted component.

The wearable article may comprise an interface for releasable mechanical connection to an electronics module. When the electronics module is mechanically connected to the wearable article at the interface, the two contacts are brought into contact with the identification element such that the two contacts are electrically connected to one another via the identification element.

The processor may be operable to control the electronics module according to the read identification information.

The processor may be operable to change a power mode of the electronics module according to the read identification information. The processor may be operable to control the electronics module to transition from a first power mode to a second power mode in response to reading the identification information. The second power mode may consume more power than the first power mode. The first power mode may be a sleep mode. The second power mode may be a normal power mode.

The processor may be operable to control the electronics module to remain in a second power mode in response to reading the identification information. The processor may thus control the electronics module to not transition to a first power mode. The second power mode may consume more power than the first power mode. The first power mode may be a sleep mode. The second power mode may be a normal power mode.

Advantageously, the processor controls the electronics module to wake-up from a sleep state/not return to a sleep state according to the read identification information. In this way, the processor advantageously does not transition to or remain in a low power mode even though biosignals are not being receive via the contacts.

The processor being operable to control the electronics module may comprise the processor being operable to disable or enable one or more components of or associated with the electronics module. The processor may be operable to disable or enable one or more components associated with processing sensor data received from the wearable article or other sensors of or associated with the electronics module. The processor may be operable to disable or enable one or more components associated with processing signals received via the contacts. The processor may determine to disable or enable one or more components according to a property of the wearable article and/or the position of the electronics module on the wearable article as identified by the identification information.

The processor may be operable to disable one or more components associated with processing signals received via the contacts in response to reading the identification information.

The processor may comprise a signal-interface module that is coupled to the two contacts. The signal-interface module may be an analog front-end. When coupled to the two contacts, the signal-interface module receives (analog)

signals from the two contacts and performs processing on the signals. The signal-interface module may output the signals to an analog-to-digital (A/D) converter that performs A/D conversion. The digital data may be provided to a digital processing module of the processor. The signal-interface module may detect the electrical connection being formed between the two contacts. The signal-interface module may measure the electrical property such as the impedance across the contacts so as to read the identification information. The signal-interface module may provide a measured value to a further component of the processor which performs the interpretation of the identification information. In response to determining that the electrical connection has been formed between the two contacts, the processor may disable the signal-interface module. Beneficially, as the contacts are electrically connected to one another, the signal-interface module is not receiving biosignals from the contacts. By disabling the signal-interface module unnecessary processing and storage of incoming signals is avoided which can reduce battery consumption for the electronics module. The signal-interface module may be controlled to be occasionally activated to check that the contacts are still electrically connected to one another.

The processor being operable to control the electronics module may comprise the processor being operable to disable or enable one or more algorithms for processing sensor data. The sensor data may be associated with the wearable article or the electronics module. The processor may be operable to disable or enable one or more algorithms associated with processing signals received via the contacts. The processor may be operable to disable one or more algorithms associated with processing signals received via the contacts in response to detecting the electrical connection between the two contacts. The processor may determine the algorithms to enable or disable according to a property of the wearable article and/or the position of the electronics module on the wearable article as identified by the identification information.

The processor being operable to control the electronics module may comprise the processor being operable to increase or decrease a sampling rate such as of a sensor of the wearable article, electronics module or associated with the electronics module. The processor may be operable to increase or decrease a sampling rate for sampling biosignals received from the wearable article. The processor may determine the sampling rate to increase or decrease according to a property of the wearable article and/or the position of the electronics module on the wearable article as identified by the identification information.

The processor being operable to control the electronics module may comprise the processor being operable to enable or disable one or more communication channels for transmitting data. The communication channels may be for transmitting sensor data. The sensor data may be associated with the wearable article or the electronics module. The processor may be operable to disable or enable communication channels for transmitting sensor data associated with signals received via the contacts. The processor may disable one or more communication channels for transmitting sensor data associated with signals received via the contacts in response to measuring the electrical property between the two contacts. Sensor data associated with signals received via the contacts may refer to data obtained by processing the received signals. The processor may determine the communication channel to enable or disable according to a property of the wearable article and/or the position of the electronics module on the wearable article as identified by the identification information.

The processor being operable to control the electronics module may comprise the processor being operable to increase or decrease a buffer size in a memory for storing data. The data may be sensor data. The sensor data may be associated with the wearable article or the electronics module. The processor may be operable to increase or decrease a buffer size for storing sensor data associated with signals received via the contacts. The processor may decrease a buffer size for storing sensor data associated with signals received via the contacts in response to measuring the electrical property between the two contacts. The processor may determine the buffer size to increase or decrease according to a property of the wearable article and/or the position of the electronics module on the wearable article as identified by the identification information.

The processor being operable to control the electronics module may comprise the processor being operable to adjust one or more coefficients used in a machine-learning algorithm. The machine-learning algorithm may generate inferences from data obtained from sensors of or accessible by the electronics module and/or data obtained from the wearable article. The coefficients may be adjusted according to a property of the wearable article and/or the position of the electronics module on the wearable article as identified by the identification information.

The processor being operable to operable to control the electronics module may comprise the processor selecting a machine-learning model for use in generating inferences according to the read identification information. The machine-learning model may have been trained for generating inferences for uses cases associated with the measured identification information. The machine-learning models may have been trained for uses cases corresponding to according to a property of the wearable article and/or the position of the electronics module on the wearable article as identified by the identification information.

The measured identification information may indicate that the electronics module is not able to receive biosignals from the wearable article, such as via the contacts.

The processor being operable to operable to control the electronics module when the measured identification information indicates that the electronics module is not able to receive biosignals from the wearable article may comprise one or more of:

(a) The processor disabling one or more components associated with processing biosignals received from a wearable article. The one or more components may be components of the electronics module and/or components external to the electronics module.

(b) The processor enabling one or more components associated with processing sensor data generated by a sensor of the electronics module. The one or more components may be components of the electronics module and/or components external to the electronics module.

(c) The processor enabling one or more algorithms for processing sensor data generated by a sensor of the electronics module.

(d) The processor increasing a sampling rate of a sensor of the electronics module.

(e) The processor disabling a communication channel for transmitting data related to biosignals received from a wearable article.

(f) The process increasing a buffer size in a memory for storing sensor data obtained from a sensor of the electronics module.

The measured identification information may indicate that the electronics module is able to receive biosignals from the wearable article, such as via the contacts. The processor being operable to control the electronics module when the measured identification information indicates that the electronics module is able to receive biosignals from the wearable article may comprise one or more of:

(a) The processor enabling one or more components associated with processing biosignals received from a wearable article. The one or more components may be components of the electronics module and/or components external to the electronics module.

(b) The processor disabling one or more components associated with processing sensor data generated by a sensor of the electronics module. The one or more components may be components of the electronics module and/or components external to the electronics module.

(c) The processor enabling one or more algorithms for processing biosignals received from the wearable article.

(d) The processor increasing a sampling rate for sampling the biosignals received from the wearable article.

(e) The processor enabling a communication channel for transmitting data related to biosignals received from the wearable article.

(f) The process increasing a buffer size in a memory for storing data derived from biosignals received from the wearable article.

The electronics module may comprise more than two contacts.

The contacts may be contact pads, studs, or prongs or other conductive elements capable of forming a conductive connection with the wearable article identifier. The contacts comprise conductive material and thus are electrical contacts. The contacts may comprise flexible conductive material. The contacts may comprise conductive elastomeric material. The contacts may be flexible, elastomeric, contact pads.

According to a second aspect of the disclosure, there is provided an electronics module for a wearable article. The electronics module comprises: a processor and at least two contacts communicatively coupled to the processor, the two contacts are arranged to be brought into contact with an identification element when positioned on the wearable article. When the electronics module is positioned on the wearable article, the two contacts are electrically connected to one another via the identification element. The processor is operable to measure an electrical property of the electrical connection formed between the two contacts by the identification element so as to read identification information that is encoded into the electrical property of the identification element.

The electronics module may be arranged to be mechanically connected to the wearable article at an interface of the wearable article.

According to a third aspect of the disclosure, there is provided a wearable article comprising an identification element that is arranged to form an electrical connection between two contacts of an electronics module when the electronics module is positioned on the wearable article, wherein identification information is encoded in an electrical property of the identification element.

The wearable article may comprise an interface for releasable mechanical connection to the electronics module. Wherein the identification element is positioned such that the electrical connection is formed between the two contacts when the electronics module is mechanically coupled to the interface.

According to a fourth aspect of the disclosure, there is provided a method of identifying a wearable article. The method comprises positioning an electronics module on a wearable article such that two contacts of the electronics module are brought into contact with an identification element and electrically connected to one another via the identification element. The method comprises measuring an electrical property of the electrical connection formed between the two contacts by the identification element so as to read identification information that is encoded into the electrical property of the identification element.

The wearable articles according to aspects of the disclosure may comprise one or more sensing units. The wearable article may comprise one or more sensing units. The one or more sensing units may be arranged to measure one or more biosignals of a user wearing the wearable article. Here, "biosignal" may refer to any signal in a living being that can be measured and monitored. The term "biosignal" is not limited to electrical signals and can refer to other forms of non-electrical biosignals. The sensing units may be used for measuring one or a combination of bioelectrical, bioimpedance, biochemical, biomechanical, bioacoustics, biooptical or biothermal signals of the user. The bioelectrical measurements include electrocardiograms (ECG), electrogastrograms (EGG), electroencephalograms (EEG), and electromyography (EMG). The bioimpedance measurements include plethysmography (e.g., for respiration), body composition (e.g., hydration, fat, etc.), and electroimpedance tomography (EIT). The biomagnetic measurements include magnetoneurograms (MNG), magnetoencephalography (MEG), magnetogastrogram (MGG), magnetocardiogram (MCG). The biochemical measurements include glucose/lactose measurements which may be performed using chemical analysis of the user's sweat. The biomechanical measurements include blood pressure. The bioacoustics measurements include phonocardiograms (PCG). The biooptical measurements include orthopantomogram (OPG). The biothermal measurements include skin temperature and core body temperature measurements. The sensing units may comprise a radar unit. The wearable article may sense a combination of external signals and biosignals of the user.

BRIEF DESCRIPTION OF THE DRAWINGS

Examples of the present disclosure will now be described with reference to the accompanying drawings, in which.

DETAILED DESCRIPTION

Figure 1:
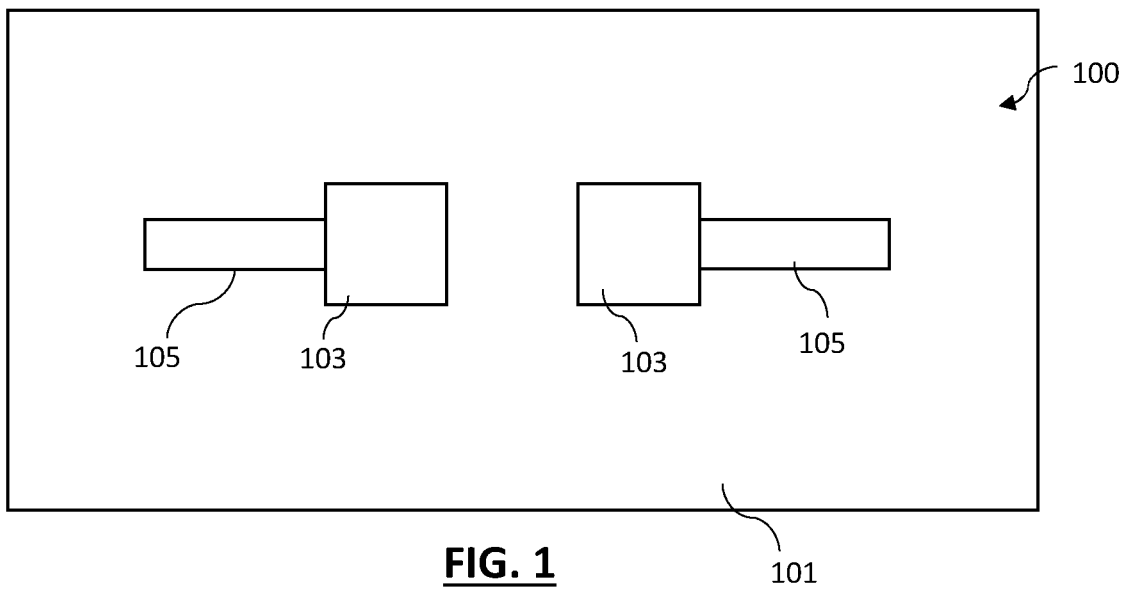
FIGS. 1 to 3 show schematic diagrams of an example wearable article.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

"Wearable article" as referred to throughout the present disclosure may refer to any form of article which may be worn by a user such as a smart watch, necklace, bracelet, or glasses. The wearable article may be a textile article. The wearable article may be a garment. The garment may refer to an item of clothing or apparel. The garment may be a top. The top may be a shirt, t-shirt, blouse, sweater, jacket/coat, or vest. The garment may be a dress, brassiere, shorts, pants, arm or leg sleeve, vest, jacket/coat, glove, armband, underwear, headband, hat/cap (e.g. a hard hat), collar, wristband, stocking, sock, or shoe, athletic clothing, personal protecting equipment, swimwear, wetsuit or drysuit The garment may be a tight-fitting garment. Beneficially, a tight-fitting garment helps ensure that the sensor devices of the garment are held in contact with or in the proximity of a skin surface of the user. The garment may be a compression garment. The garment may be an athletic garment such as an elastomeric athletic garment.

The wearable article may be constructed from a woven or a non-woven material. The wearable article may be constructed from natural fibres, synthetic fibres, or a natural fibre blended with one or more other materials which can be natural or synthetic. The yarn may be cotton. The cotton may be blended with polyester and/or viscose and/or polyamide according to the particular application. Silk may also be used as the natural fibre. Cellulose, wool, hemp, and jute are also natural fibres that may be used in the wearable article. Polyester, polycotton, nylon and viscose are synthetic fibres that may be used in the wearable article.

The following description refers to particular examples of the present disclosure where the wearable article is a garment. It will be appreciated that the present disclosure is not limited to garments and other forms of wearable article are within the scope of the present disclosure as outlined above.

Figure 2:
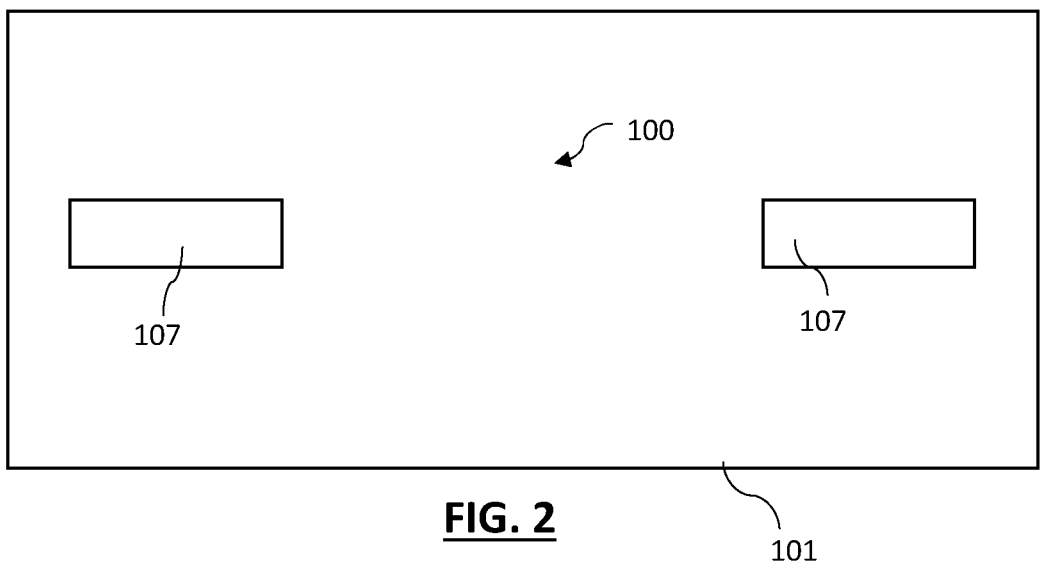
Figure 3:
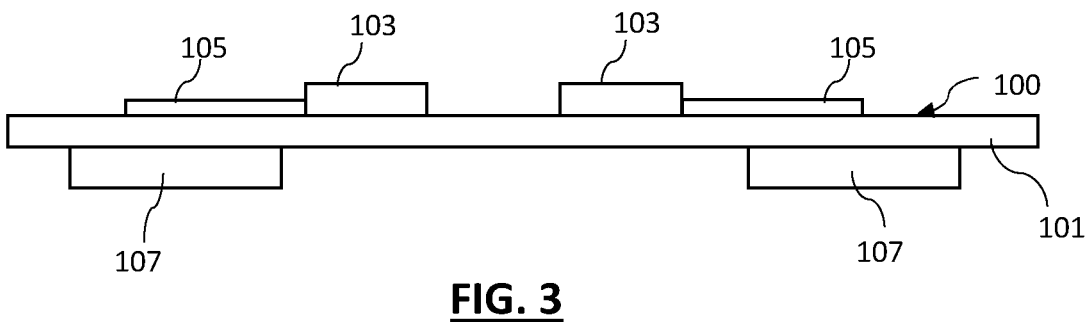

Referring to FIGS. 1 to 3, there is shown a wearable article 100. The wearable article 100 comprises a textile body 101. An interface (not shown) may also be provided to releasably mechanically connect an electronics module 300 (FIGS. 4 and 5) to the wearable article 100.

The wearable article 100 comprises conductive regions 103, 105, 107.

The conductive regions comprise a pair of connection regions 103 that are spaced apart from one another and are not electrically connected to one another. The connection regions 103 are separated by the non-conductive textile body 101. The pair of connection regions 103 are arranged to form electrical connections with a corresponding pair of contacts of the electronics module 300 when mechanically connected to the wearable article 100. The spacing of the connection regions 103 correspond to the spacing between the pair of contacts of the electronics module 300.

The conductive regions comprise a pair of electrodes 107 for measuring biosignals from a skin surface of a wearer of the wearable article 100. The pair of electrodes 107 are each electrically connected to one of the connection regions 103 by a conductive pathway 105. This enables information to be exchanged between the electrodes 107 and the electronics module 300 when the electronics module 300 is electrically connected to the connection regions 103. The connection regions 103 and electrodes 107 are provided on opposing surfaces of the textile body 101. The electrodes 107 are provided on a surface of the textile body 101 that faces the skin surface when worn.

The present disclosure is not limited to wearable articles that incorporate electrodes. Other forms of sensing unit such as temperature sensors, hydration sensors, chemical sensors, motion sensors, and light sensors may be incorporated into the wearable article. The sensing units may be biosensors for use in measuring a biosignal. Electrocardiography (ECG) and electromyography (EMG) signals are examples of biosignals that may be measured by the sensing units.

Figure 4:
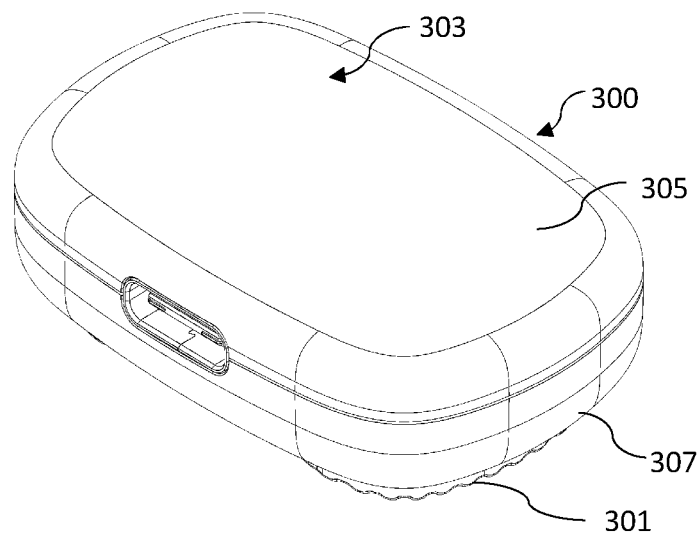
FIGS. 4 to 5 show perspective views of an example electronics module according to aspects of the present disclosure.
Figure 5:
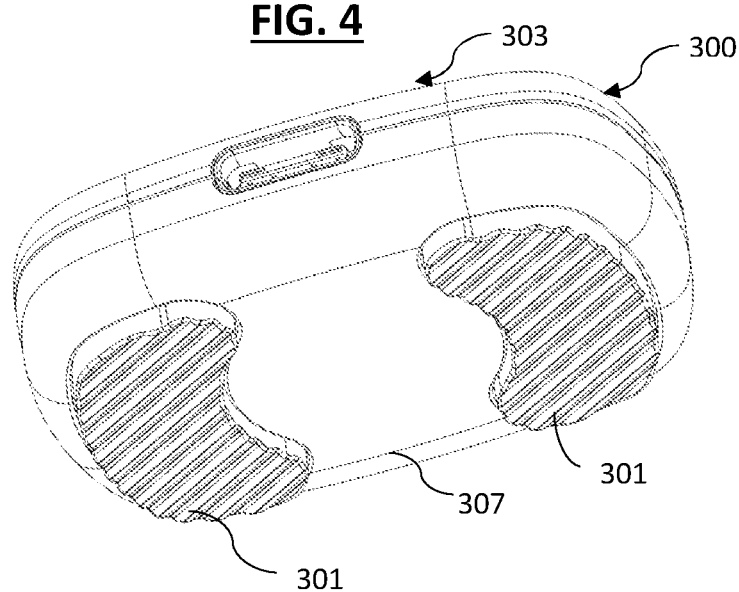

Referring to FIGS. 4 and 5, there is shown an electronics module 300 according to aspects of the present disclosure. The electronics module 300 comprises a plurality (two in this example) of contacts 301 and a housing 303. The housing 303 houses components of the electronics module 300 such as a processor of the electronics module 300. The processor is communicatively coupled to the contacts 301 such that the processor may receive information from the contacts 301. The housing 303 comprises a top enclosure 305 and a bottom enclosure 307. The contacts 301 are attached to the bottom enclosure 307.

The housing 303 is formed of a rigid material in this example. The housing 303 may comprise a (rigid) polymeric material. The polymeric material may be a rigid plastic material. The rigid plastic material may be ABS or polycarbonate plastic but is not limited to these examples. The rigid plastic material may be glass reinforced. The rigid housing 303 may be injection moulded. The rigid housing 303 may be constructed using a twin-shot injection moulding approach.

The two contacts 301 are in the form of contact pads 301 that are provided on an outer surface of the housing 303. The contact pads 301 are formed from a flexible, conductive, material, but this is not required in all examples. The contact pads 301 are spaced apart from one another on the bottom surface of the housing 303. "Rigid" will be understood as referring to a material which is stiffer and less able to bend than the contact pads 301 formed of flexible material. The rigid housing 303 may still have some degree of flexibility but is less flexible than the flexible material of the contact pads 301. The contact pads 301 comprise conductive material, and thus act as conductive contact pads 301 for the electronics module 300.

The use of flexible conductors 301 is generally preferred as compared to rigid, metallic, conductors 301 as this means that hard pieces of conductive metallic material such as poppers or studs are not required to electrically connect the electronics module 300 to the wearable article. This not only improves the look and feel of the wearable article but also reduces manufacturing costs as it means that hardware features such as additional eyelets and studs do not need to be incorporated into the wearable article to provide the required connectivity. An additional problem with rigid metallic conductors is that their hard, abrasive, surfaces may rub against conductive elements such as conductive thread of the garment and cause the conductive thread to fray. Rigid contact pads 119 such as those made from a rigid metallic material are also within the scope of the present disclosure. The present disclosure is not limited to contact pads and other forms of electrical contacts such as studs, prongs or pins are within the scope of the present disclosure.

The contact pads 301 are formed of two separate pieces of conductive elastomeric material 301 that form first and second flexible contacts 301. The conductive elastomeric material used in this example is a conductive silicone rubber material, but other forms of conductive elastomeric material may be used. Beneficially, elastomeric material such as conductive silicone rubber can have an attractive visual appearance and may easily be moulded or extruded to have branded or other visual elements.

The elastomeric material is made conductive by distributing a conductive material into the elastomeric material. Conductive particles such as carbon black and silica are commonly used to form conductive elastomeric materials, but the present disclosure is not limited to these examples. The contact pads 301 may also comprise a 2D electrically conductive material such as graphene or a mixture or composite of an elastomeric material and a 2D electrically conductive material.

The contact pads 301 define an external surface that faces away from the bottom enclosure 307. The surface is arranged to interface with the wearable article. The surface is textured to provide additional grip when positioned on the garment 300 or the skin surface. The texture may be, for example, a ribbed or knurled texture. The elastomeric material 301 shown in the Figures has a ribbed texture. The contact pads 301 may be flat and are not required to have a textured surface.

Figure 6:
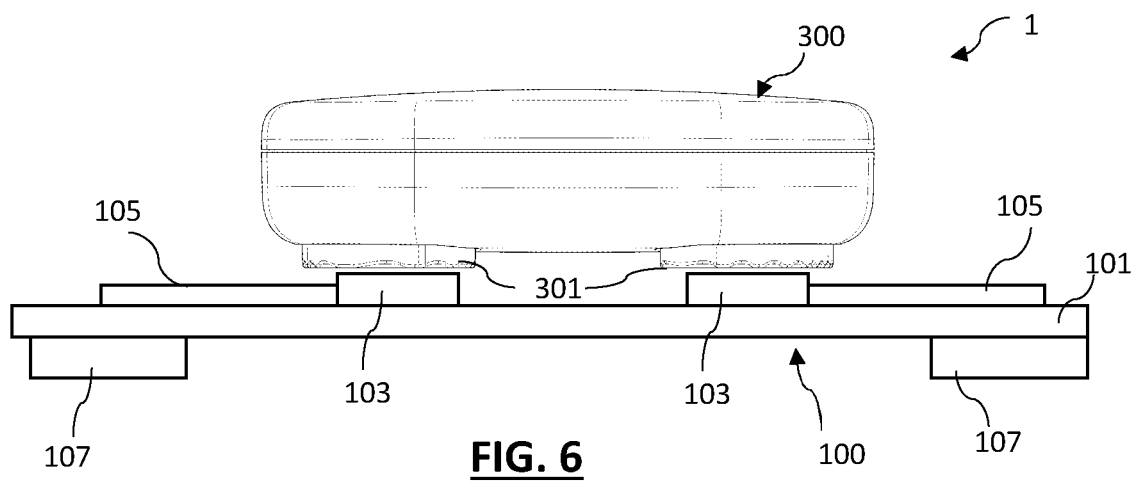
FIG. 6 shows a schematic diagram of a wearable assembly comprising the wearable article of FIGS. 1 to 3 and the electronics module of FIGS. 4 to 5.

Referring to FIG. 6, there is shown a wearable assembly 1 comprising the wearable article 100 of FIGS. 1 to 3 and the electronics module 300 of FIGS. 4 and 5. The electronics module 300 is positioned on the wearable article 100 and held in releasable mechanical coupling with the wearable article 100 by the interface (not shown) of the wearable article 100. The interface retains the electronics module 300 in a generally fixed position. When the electronics module 300 is positioned on the wearable article, the contacts 301 of the electronics module 300 are placed into conductive connection with the connection regions 103 of the wearable article 100. This enables to the electronics module 300 to receive measurement signals from the electrodes 107 via the conductive pathways 105 and connection regions 103.

The electronics module 300 detects that it is receiving biosignals from the electrodes 107 and controls electronics module 300 accordingly. For example, the electronics module 300 enables one or more processing modules for processing biosignals received via the contacts 301, enables one or more algorithms for processing the receiving biosignals, and configures a communicator of the electronics module 300 to enable one or more communication channels for transmitting the receiving biosignals and/or biodata derived from the biosignals.

It would be desirable for the electronics module 300 to be able to couple to many different types of wearable articles and/or different positions on the same wearable article. It would be further desirable for the electronics module 300 to be able to identify information such as a property of the wearable article the electronics module 300 coupled to and/or the position of the electronics module 300 on the wearable article. This may enable the electronics module 300 to configure one or more of its operations such that they are more suited to the type of wearable article and/or position of the electronics module 300 on the wearable article. For example, the electronics module 300 may configure itself based on type of data (if any) it will receive from the wearable article and/or the likely activities performed by the wearer when wearing the wearable article.

While a memory or RFID tag could be provided in the wearable article that stores identification information, this typically increases the cost and complexity of the wearable article. Moreover, the electronics module 300 may require additional components so as to interface with and read the memory or RFID tag.

Figure 7:
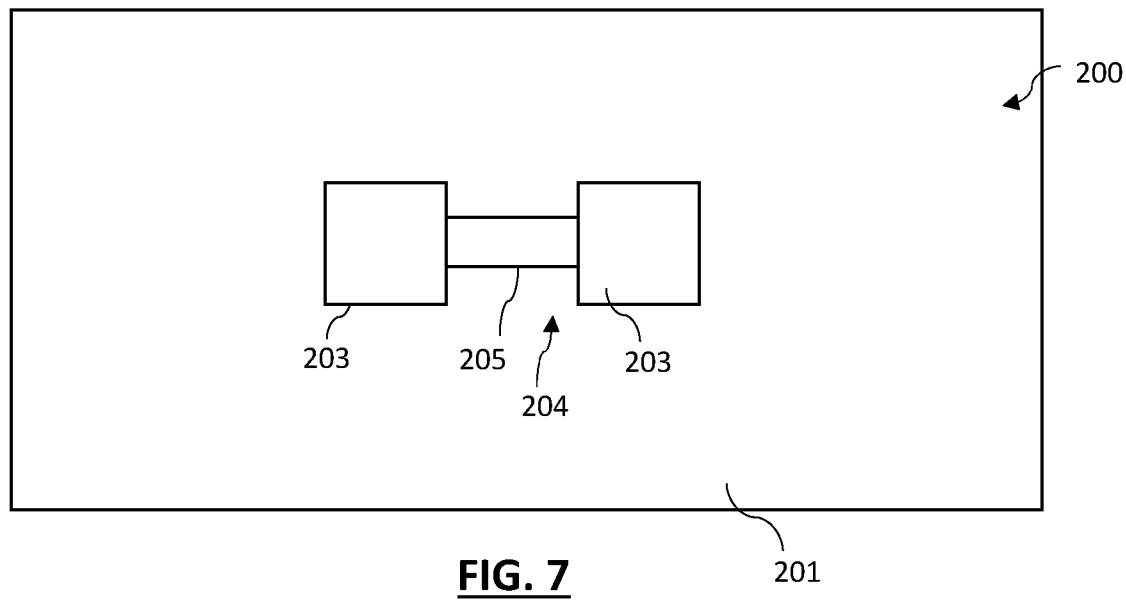
FIGS. 7 to 8 show schematic diagrams of another example wearable article according to aspects of the present disclosure.
Figure 8:
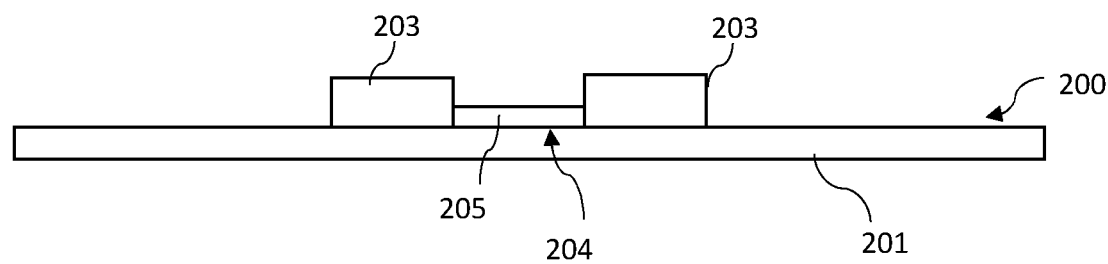

Referring to FIGS. 7 and 8, there is shown a wearable article 200 according to aspects of the present disclosure. The wearable article 200 comprises a textile body 201. An interface (not shown) may be provided to releasably mechanically connect an electronics module 300 (FIGS. 4 and 5) to the wearable article 200.

The wearable article 200 comprises an identification element 204. The identification element 204 comprises a length of conductive material 204. The identification element 204 may comprises additional components such as discrete resistors or capacitors but this is not required. Preferred examples form the identification element 204 out of a simple, uninterrupted, strip of conductive material 204. The length of conductive material 204 comprises connection regions 203 and a bridging conductor 205 that extends between the connection regions 203. This means that the connection regions 203 are electrically connected to one another by the bridging conductor 205. The pair of connection regions 203 are arranged to form electrical connections with a corresponding pair of contacts of the electronics module 300 when mechanically connected to the wearable article 100. The spacing of the connection regions 203 correspond to the spacing between the pair of contacts of the electronics module 300.

Identification information is encoded into an electrical property of the length of conductive material 204. The length of conductive material 204 has a characteristic, measurable, value that can be identified by the electronics module 300. The identification information may identify a property of the wearable article 200 such as its type and/or a location of the length of conductive material 204 on the wearable article 200. In this way, the electronics module 300 can read the identification information simply by measuring the electrical property of the length of conductive material 204.

The length of conductive material 204 may have a uniform width along its length. The length of conductive material 204 may have a uniform thickness along its length. That is, the connection regions 203 and bridging conductor 205 do not need to have distinctive geometries as shown in FIGS. 7 and 8 and instead may formed as part of the same uniform line of conductive material. The line of conductive material may extend from a surface of the textile body 201 to form a raised conductive region or may be substantially flush or recessed within the textile body 201. In preferred examples and as shown in FIGS. 7 and 8, the conductive regions 203 are wider and thicker (extend to a greater extent away from the surface of the textile body 201) than the bridging conductor 204. The length of conductive material 204 may or may in part comprise a continuous, uninterrupted, length of conductive material.

In this example, the length of conductive material 204 is formed from conductive yarn that is integrally knit or woven with the textile body. That is, the textile body 201 and length of conductive material 204 form an integral knitted component. This is not required in all examples. The length of conductive material 204 may be otherwise incorporated into the textile body 201 or formed from other kinds of conductive material such as conductive ink or conductive wires.

In this example, the wearable article 200 does not comprise electrodes or other sensing units. This means that when an electronics module 300 couples with the wearable article, it will not from a communicative connection with electrodes or other sensing units of the wearable article 200. This, however, is not required in all examples. The wearable article 200 may comprise electrodes or other forms of sensing units. The sensing units may be provided in a similar way to the arrangement of FIGS. 1 to 3 such that they may be electrically connected to the electronics module 300 via additional connection regions and conductive pathways within the wearable article 200. In other examples, the sensing units may wirelessly communicate with the electronics module 300 such that a wired connection is not required. The interface (not shown) of the wearable article 200 may include communication circuitry to enable the wireless exchange of information between the electronics module 300 and the sensing units. The sensing units may have their own communication circuitry to enable the wireless exchange of information.

Figure 9:
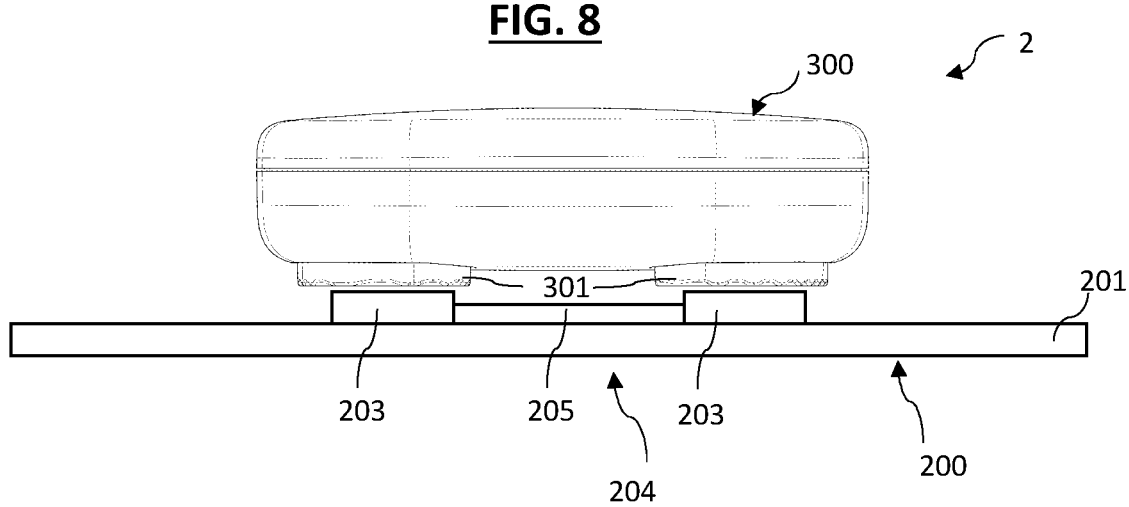
FIG. 9 shows a schematic diagram of a wearable assembly comprising the wearable article of FIGS. 7 to 8 and the electronics module of FIGS. 4 to 5.

Referring to FIG. 9, there is shown a wearable assembly 2 comprising the wearable article 200 of FIGS. 7 to 8 and the electronics module 300 of FIGS. 4 and 5. The electronics module 300 is positioned on the wearable article 200 and held in releasable mechanical coupling with the wearable article 200 by the interface (not shown) of the wearable article 200. The interface retains the electronics module 300 in a generally fixed position. When the electronics module 300 is positioned on the wearable article 200, the contacts 301 of the electronics module 300 are placed into conductive connection with the length of conductive material 204. The contacts 301 are each positioned on a respective one of the connection regions 203 of the wearable article 200. As the connection regions 203 are electrically connected via the bridging region 205, this means that the contacts 301 are electrically connected to one another via the length of conductive material 204.

In the example of FIG. 9, the length of conductive material 204 has an overall length that is slightly greater than the spacing between the two contacts 301. The length of conductive material 204 may extend to a greater length such that the electronics module 300 can be positioned at multiple locations on the length of conductive material 204 while still forming the electrical connection between the contacts 301. The length of conductive material 204 may have uniform properties (e.g. width, thickness or resistivity) along all or part of its length such that the same electrical property is measured regardless of the position of the electronics module 300 on the length of conductive material. The length of conductive material 204 may have varying properties along all or part of its length such that different electrical properties are measured depending on the position of the electronics module 300 on the length of conductive material 204. As an example, the wearable article 200 may be a wristband and the length of conductive material 204 may extend around all or a majority of the circumference of the wristband to enable the electronics module to be positioned at a number of different locations on the wristband.

A processor of the electronics module 300 is able to detect that the electrical connection has been formed between the two contacts 301 and measure an electrical property of the electrical connection formed between the two contacts 301 by the conductive material. This enables the processor to read the identification information. This may involve the processor measuring the impedance across the two contacts 301.

In an example, the electronics module 300 when coupled to the wearable article 200 first looks for biosignals (e.g. ECG signals) being received via the contacts 301. As no biosignals are received, the processor of the electronics module 300 triggers the measurement of the electrical property across the contacts 301.

Advantageously, the wearable article 200 incorporates a simple identifier 204 that may be read by the electronics module 300 so as to read the identification information. The simpler identifier 204 is in the form of a length of conductive material 204 that can easily be integrated into the wearable article 200 using established techniques such as, but not limited to, screen printing, knitting or weaving. The length of conductive material 204 can be integrated into the wearable article 200 at the time of manufacturing the wearable article 200 and, if desired, at the same factory. The wearable article identifier 204 is passive, analog, and has a minimal footprint on the wearable article. The approach of the present disclosure does not require additional complicated circuitry such as a read-only memory, RFID tag or similar to be incorporated into the wearable article 200.

It will be appreciated that wearable article identifiers 204 such as for different wearable articles 200 or positions on a wearable article 200 will have different electrical properties (e.g. different impedance values) so as to identify (uniquely) the type of wearable article 200 or position on the wearable article 200. The different electrical properties may be achieved by modifying, for example, the length, width, or thickness of the length of conductive material 204 or by using a conductive material with a different resistivity. In some examples, the length of the bridging conductor 205 between the connection regions 203 may be varied to change the resistance value. Since the spacing between the contacts 301 of the electronics module 300 is generally fixed, the variation in the length bridging conductor 205 may be achieved by allowing the bridging conductor 205 to adopt a tortuous path between the connection regions 203. The bridging conductor 205 may have, for example, a wavy, undulating, serpentine, or sinusoidal profile.

Advantageously, different conductive materials 204 may have different electrical properties and so encode different identification information. These properties can be measured by the electronics module 300.

For example, if the electronics module 300 determines that the resistance of the electrical connection between the contacts is within the range of 100 Ohm to 140 Ohm, the electronics module 300 determines that it is positioned on the front of a T-shirt. A resistance in the range 160 Ohm to 200 Ohm may indicate that the electronics module 300 is positioned on the back of a T-shirt. A resistance in the range 220 Ohm to 260 Ohm may indicate that the electronics module 300 is positioned on a bra. A resistance in the range 280 Ohm to 320 Ohm may indicate that the electronics module 300 is positioned on leggings. A resistance in the range 340 Ohm to 380 Ohm may indicate that the electronics module 300 is positioned on a wristband. A resistance in the range 400 Ohm to 440 Ohm may indicate that the electronics module 300 is positioned on a wristband. These ranges are just examples.

Advantageously, in response to reading the identification information the processor of the electronics module 300 is operable to control the electronics module 300. This provides a simple and effective mechanism for controlling the electronics module 300 according to identification information. The electronics module 300 may, for example, be controlled based on a property of the wearable article and/or the location of the length of conductive material on the wearable article 200 as determined from the identification information. This allows for the same electronics module 300 to be used for a number of different wearable articles 200/positions on the same or different wearable articles 200.

For example, it may be desirable for the same electronics module 300 to be coupled to a user during the day and at night while the user is sleeping. This allows for continual monitoring of the user. It may be desirable to provide daywear and sleepwear for the user that include interfaces for mechanically coupling with the electronics module 300. The daywear may be in the form of tight-fitting clothing with internal electrodes for measuring properties such as heart rate and muscle activity. The sleepwear may be in the form of an unobtrusive article that can be comfortable worn while sleeping. The sleepwear may be in the form of a wristband.

In some examples, the daywear has the arrangement of the wearable article 100 of FIGS. 1 to 3 and the nightwear has the arrangement of the wearable article 200 of FIGS. 7 to 9. The daywear is not required to have the arrangement of FIGS. 1 to 3 and may, for example, have sensing units such as electrodes in addition to a wearable article identifier 204 (FIGS. 7 to 9). Generally, it is preferred that the sleepwear does not have sensing units such as electrodes so that the sleepwear is as unobtrusive and comfortable as possible, but the sleepwear may include sensing units if desired.

When the electronics module 300 is coupled to the daywear, the electronics module 300 is able to receive biosignals from the electrodes 107 and perform operations accordingly. The electronics module 300 may configure itself to perform operations in response to detecting that biosignals are being received via the contacts 301. The biosignal detection may cause the electronics module 300 to wake-up from a low power state and/or remain in a normal power state. If a wearable article identifier 204 is provided, the electronics module 300 may configure itself to perform operations associated with the daywear such as processing operations associated with the type of biosignals that will be received. The wearable article identifier 204 is not required for the daywear as the identification from the biosignals may be sufficient.

When the electronics module 300 is coupled to the sleepwear, the electronics module 300 will not receive biosignals form the sleepwear and thus will not be able to identify that it is being worn. This means the detection of biosignals is not able to be used to identify the sleepwear or cause the electronics module 300 to wake-up from a low power state and/or remain in a normal power state. However, as length of conductive material 204 is provided, the electronics module 300 is able to detect that an electrical connection has been formed between the contacts 301 by the length of conductive material 204 and measure the electrical property of the electrical connection to read the identification information encoded in the length of conductive material 204. This enables the electronics module 300 to identify that it has been connected to sleepwear and can configure its operations accordingly. Reading the identification information may also cause the electronics module 300 to wake-up from a low power state and/or remain in a normal power state.

In some examples, in response to detecting that it is coupled to sleepwear, the electronics module 300 may disable one or more processing modules associated with processing biosignals received from external sensing units such as electrodes. The one or more disabled processing modules may comprise a signal-interface module that is coupled to the two contacts.

The signal-interface module may be an analog front-end. When coupled to the two contacts, the signal-interface module receives (analog) signals from the two contacts and performs processing on the signals. The signal-interface module may output the signals to an analog-to-digital (A/D) converter that performs A/D conversion. The digital data may be provided to a digital processing module of the processor. In response to determining that the electrical connection has been formed between the two contacts, the processor may disable the signal-interface module. Beneficially, as the contacts are electrically connected to one another, the signal-interface module is not receiving biosignals from the contacts. By disabling the signal-interface module, unnecessary processing and storage of incoming signals is avoided which can reduce battery consumption for the electronics module. The signal-interface module may still be controlled to be occasionally activated to check that the contacts are still electrically connected to one another. In other words, the one or more processing modules may only be temporarily disabled and may be occasionally activated so as to confirm that the electronics module 300 remains connected to the sleepwear. The one or more processing modules may be occasionally activated to measure the electrical property across the contacts 301.

In some examples, in response to detecting that it is coupled to sleepwear, the electronics module 300 may activate one or more sensing units of the electronics module 300 associated with monitoring sleep states.

In some examples, in response to detecting that it is coupled to sleepwear, the electronics module 300 may configure one or more sensing units of the electronics module 300 to perform sleep related sensing. For example, a motion sensor of the electronics module 300 may have its gain/resolution adjusted so it is better suited for monitoring small motions while the user is sleeping. For example, the sampling rate of a temperature sensor of the electronics module 300 may be increased to provide more frequent measurements of ambient, skin surface, or core temperature while the user is sleeping.

In some examples, in response to detecting that it is coupled to sleepwear, the electronics module 300 may configure a communicator of the electronics module 300 to disable one or more communication channels associated with transmitting biosignal data received via the contacts 301. This may help reduce the unnecessary memory use and free up resources for transmitting other data associated with sleep monitoring and/or use by algorithms for use in analysing/tracking sleep.

Advantageously, the same electronics module 300 is able to be used for both daywear and sleepwear. The electronics module 300 is able to configure itself and optimise its operations depending on whether it is connected to daywear or sleepwear. Importantly still, the same contacts 301 of the electronics module 300 that are used to receive biosignals for the daywear are used to read the wearable article identifier for the sleepwear. This simplifies the design and construction of the electronics module 300 as additional contacts are not required. Additional contacts may increase the size, cost and complexity of the electronics module 300.

The present disclosure is not limited to distinguishing between daywear and sleepwear.

If the electronics module 300 determines by reading the identification information from the length of conductive material 204 that it is coupled to performance wear (e.g. sports apparel), the electronics module 300 may configure itself for performance monitoring. If the electronics module 300 determines by reading the identification information from the length of conductive material 204 that it is coupled to workwear (e.g. protective equipment worn in an industrial setting), the electronics module 300 may configure itself for workplace monitoring. If the electronics module 300 determines by reading the identification information from the length of conductive material 204 that it is coupled to patient wear (e.g. patient gowns worn in a hospital or other medical environment), the electronics module 300 may configure itself for patient monitoring.

The identification information encoded in the length of conductive material 204 may identify properties of the wearable article 200 such as the size of the wearable article. The compensation that the electronics module 300 applies to incoming biosignals may be determined based on the wearable article size. For example, wearable articles of different sizes (e.g. small, medium, and large) may comprise the same type of electronics but due to the different fabric stretch properties of these different wearable articles the electronics may perform differently. By identifying the size of the wearable article 200, the electronics module 300 is able to determine a compensation to apply. In some examples, certain sizes of wearable article (e.g. extra small, small, and medium) may have first type of electronics, while other sizes of wearable article (e.g. large, extra-large, and extra extra) may have a different, second, type of electronics. The size of the wearable article and/or the type of electronics present may be identifiable from encoded identification information.

Figure 10:
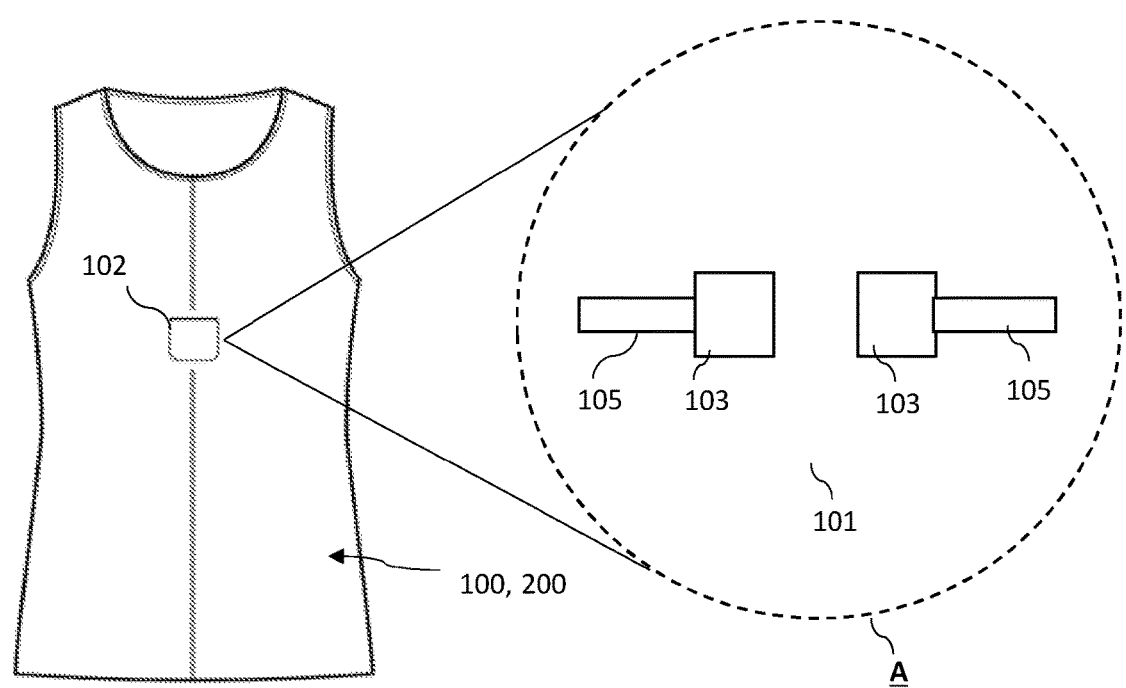
FIG. 10 shows a front view of another wearable article according to aspects of the present disclosure.
Figure 11:
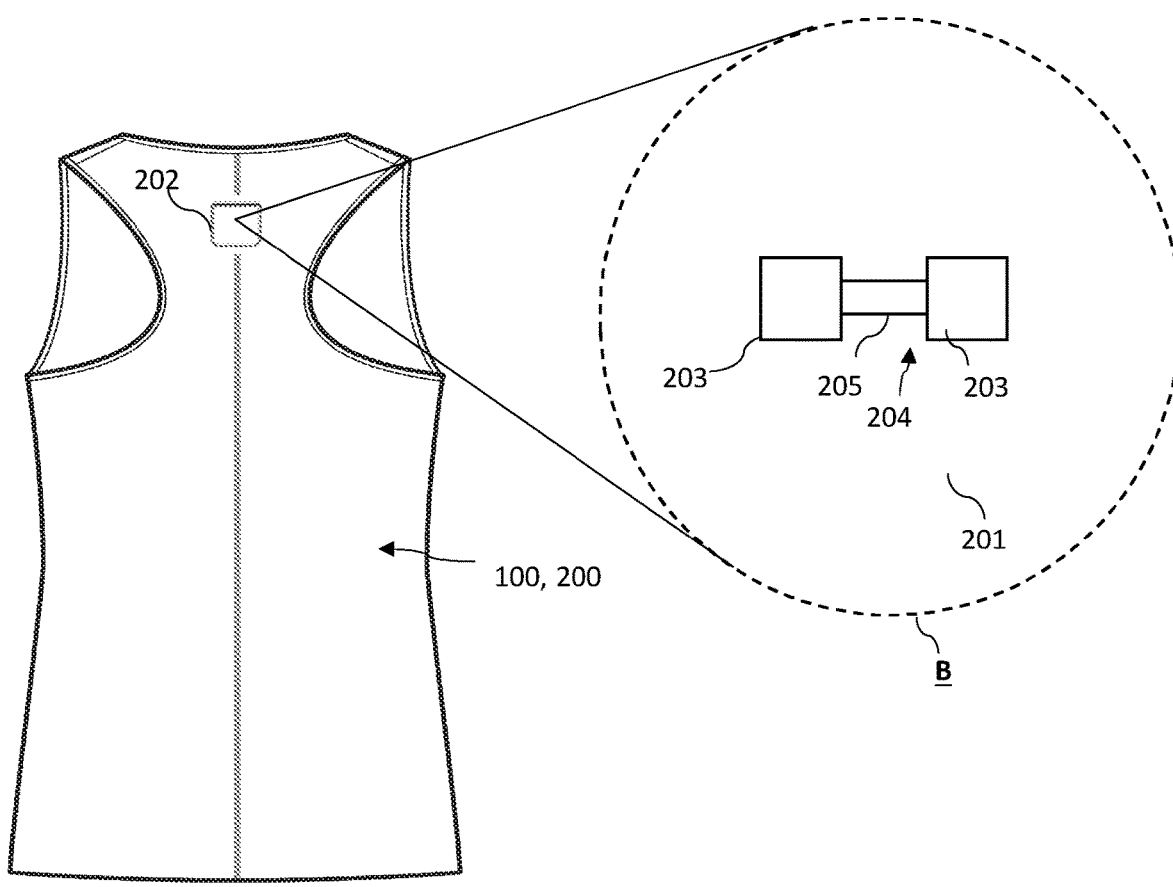
FIG. 11 shows a rear view of the wearable article of FIG. 10.

Referring to FIGS. 10 and 11, there is shown a wearable article 100, 200 according to aspects of the present disclosure. The wearable article 100, 200 is in the form of a top.

The wearable article 100, 200 comprises a plurality (two in this example) of interfaces 102, 202 for forming releasable mechanical couplings with the electronics module 300 (FIGS. 6 and 7). The interfaces 102, 202 securely hold the electronics module 300 in place with respect to the wearable article 300 such that the coupling between the electronics module 300 and the wearable article 100, 200 can be optimised. The interface 102, 202 in this example are pockets 102, 202 that apply pressure to the electronics module 300 to hold the electronics module 300 in electrical connection with the wearable article 100, 200. The pockets 102, 202 are elasticated pockets 102, 202. The pockets 102, 202 allow the user to position the electronics module 300 in the pocket 102, 202 and remove it therefrom. The pocket 102, 202 applies a compressive force to help hold the electronics module 300 in a generally fixed position within the pocket 102, 202. This is not required in all examples as gripping surfaces of the electronics module 300 and/or the wearable article 100, 200 may be sufficient for limiting relative movement between the electronics module 300 and the wearable article 100, 200. Additionally, or separately, the electronics module 300 and the wearable article 100, 200 may comprise magnetic elements to help hold the electronics module 300 in a fixed position relative to the wearable article 100, 200 The housing of the electronics module 300 may be constructed to enable a magnet to be retained therein. In particular, a recess may be provided in an inner surface of a bottom enclosure of an electronics module 300 sized to retain a magnet. Other forms of interface are within the scope of the present disclosure.

A first of the interfaces 102 is provided on a front surface of the wearable article 100, 200. The first interface 102 is located in a central chest region. The inside of the pocket 102 ("A") includes the connection arrangement as shown in FIGS. 1 to 3. In particular, conductive regions 103, 105 are provided on an outward facing surface of the textile body 101. The outward surface of the textile body 101 is covered by the pocket membrane 102 in the area of the conductive regions 103, 105. The conductive regions comprise the connection regions 103, conductive pathways 105, and electrodes (not shown). The electrodes are provided on a skin facing surface of the textile body 101.

A second of the interfaces 202 is provided on a rear surface of the wearable article 100, 200. The second interface 202 is located in an upper back region. The inside of the pocket 202 ("B") includes the connection arrangement shown in FIGS. 4 to 6. In particular, conductive regions 203, 205 are provided on an outward facing surface of the textile body 101. The outward surface is covered by the pocket membrane 202 in the area of the conductive regions 203, 205. The conductive regions comprise the length of conductive material 204 which comprises the pair of connection regions 203 bridged by bridging conductor 205. The length of conductive material encodes identification information in an electrical property.

Electrodes or other sensing units may not be provided in the vicinity of the second interface 202. Moreover, electrodes or other sensing units are not electrically connected to the connection regions 203. However, it may still be desirable to position the electronics module 300 in the pocket 202 such as to perform sensing operations using internal sensors of the electronics module 300.

The wearable article 100, 200 may be an article of performance wear. The user may connect the electronics module 300 to the interface 102 when monitoring of biosignals measured by electrodes of the wearable article 100, 200 is desired. The user may connect the electronics module 300 to the interface 202 when monitoring of biosignals measured by electrodes not critical and other forms of monitoring are desired.

Advantageously, when the electronics module 300 is mechanically coupled to the first interface 102, the contacts 301 (FIGS. 6 and 7) of the electronics module 300 are brought into contact with the connection regions 103. This enables to the electronics module 300 to receive measurement signals from the electrodes 107 via the conductive pathways 105 and connection regions 103. The electronics module 300 detects that it is receiving biosignals from electrodes 107 and configures one or more operations of the electronics module 300 accordingly. For example, the electronics module 300 enables one or more processing modules for processing biosignals received via the contacts 301, enables one or more algorithms for processing the receiving biosignals, and configures a communicator of the electronics module 300 to enable one or more communication channels for transmitting the receiving biosignals and/or biodata derived from the biosignals. The determination of whether biosignals are received is used by the electronics module 300 to identify that it is mechanically coupled to the first interface 102.

Advantageously, when the electronics module 300 is mechanically coupled to the second interface 202, the contacts 301 of the electronics module 300 are brought into contact with the connection regions 203. As the connection regions 203 are electrically connected via the bridging region 205, this means that the contacts 301 are electrically connected to one another via the length of conductive material 203, 205.

The electronics module 300 is able to measure the electrical property of the connection formed between the two contacts 301 so as to read identification information encoded in the length of conductive material 204. The read identification information identifies that the electronics module 300 is coupled to the wearable article 200 at the second interface 202. In particular, the measured identification information has an impedance value that is within a range associated with the second interface 202. The electronics module 300 compares the measured impedance value to a look-up table to determine that the measured impedance value identifies that the electronics module 300 is coupled to the second interface 202.

Advantageously, by detecting that the electronics module 300 is connected to the second interface 202 the electronics module 300 is able to configure itself to perform operations suitable for its connection with the second interface 202. The electronics module 300 is able to detect that it has been coupled to wearable article 200. Electronics module 300 may wake-up from a low power state or not transition to a low power state. That is, the electronics module 300 will not power down even though it is not receiving biosignals from the wearable article 200.

Advantageously, the electronics module 300 being connected to the second interface 202 may be associated with the user performing activities such as high impact/combat sports. In such activities, it is desirable to position the electronics module 300 in an unobtrusive location. In response to reading the identification information, the electronics module 300 may configure itself to perform operations associated with monitoring activity during high impact/combat sports. This may involve the electronics module 300 configuring a motion sensor and associated algorithms such that they are suitable for detecting events associated with a rapid acceleration and/or deceleration. This enables the electronics module 300 to detect events associated with collisions or other impacts that may have caused the user to suffer a concussion or other form of injury. The electronics module 300 may increase the size of a buffer for storing motion sensor data. The electronics module 300 may disable operations associated with processing, storing, and communicating data associated with biosignals received via the contacts 301 such that more resources are made available for motion tracking and analysis.

Advantageously, the electronics module 300 being connected to the second interface 202 may be associated with the user performing activities where location tracking is desired such as long-distance running, hiking or orienteering. In response to reading the identification element 204, the electronics module 300 may configure itself to perform location tracking (such as by enabling a location sensor), itself to increase the sampling rate of the location sensor, activate communication channels for transmitting location data, and/or enable algorithms for use in location tracking and analysis. The electronics module 300 may increase the size of a buffer for storing location tracking data. The electronics module 300 may disable operations associated with processing, storing, and communicating data associated with biosignals received via the contacts 301 such that more resources are made available for location tracking and analysis. Activate a location tracking sensor of the electronics module 300 such as a Global Navigation Satellite System (GNSS) receiver of the electronics module 300.

Advantageously, the electronics module 300 may configure one or more machine-learning algorithms depending on whether the electronics module 300 is coupled to the first interface 102 or the second interface 202. For example, the electronics module 300 may run a machine-learning algorithm for generating interfaces related to user motion from motion data recorded by a motion sensor. The machine-learning algorithm for performing activity classification for the user. This may determine, for example, whether the user is running, cycling, swimming, sitting or standing. Different coefficients for the machine-learning algorithm ora different trained model may be used based on whether the electronics module is coupled to the first interface 102 or the second interface 202. For example, one set of machine-learned models may have been trained from training data obtained while electronics module 300 is coupled to the first interface 102 while another set of machine-learned modules may have been trained from training data obtained while electronics module 300 is coupled to the second interface 202. The electronics module 300 may select appropriate trained models to use based on the interface the electronics module 300 is coupled to.

Figure 12:
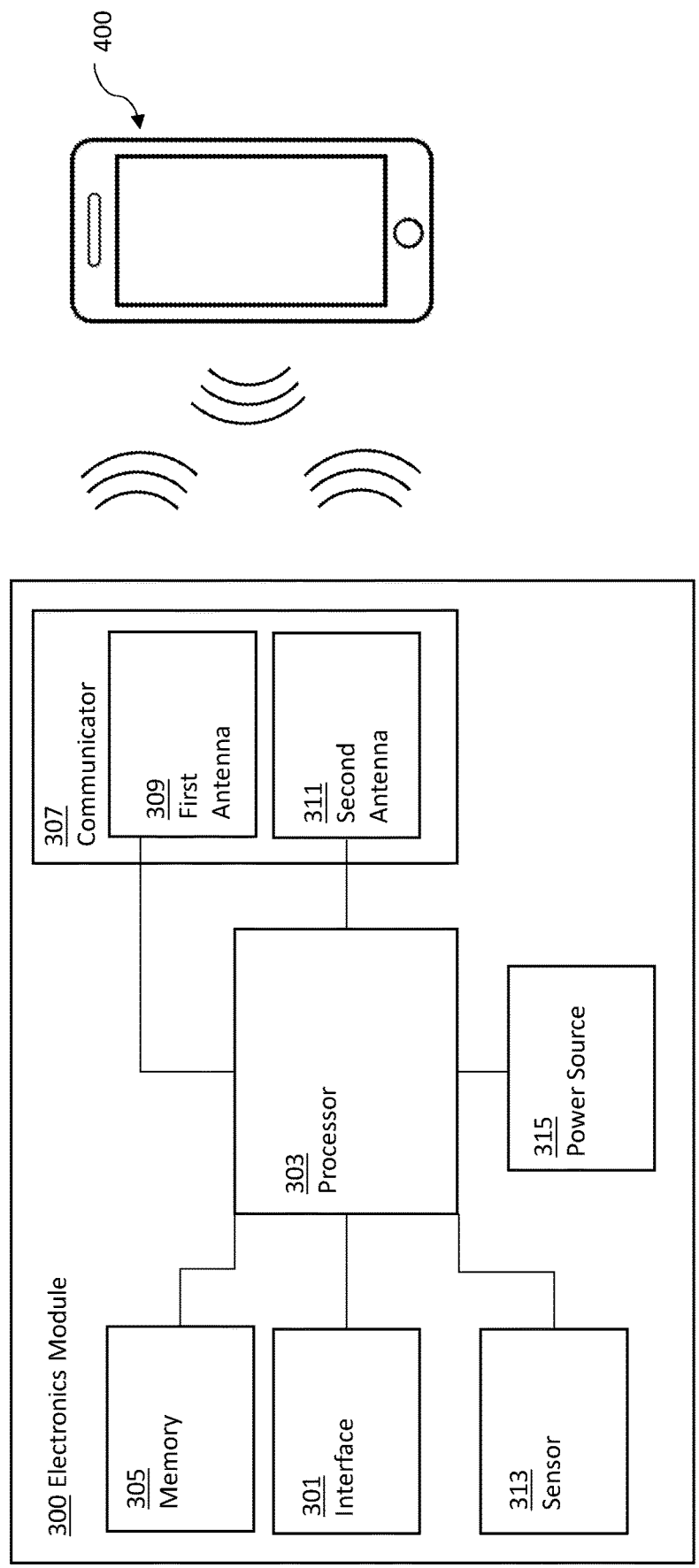
FIG. 12 shows a schematic diagram for an example electronics module according to aspects of the present disclosure while in communication with an external device.

Referring to FIG. 12, there is shown a schematic diagram for an example electronics module 300 according to aspects of the present disclosure. The electronics module 300 is communicatively coupled to an external device 400 over a wireless network.

The electronics module 300 is arranged to wirelessly communicate data to the external device 400. Various protocols enable wireless communication between the electronics module 300 and the external device 400. Example communication protocols include Bluetooth®, Bluetooth® Low Energy, and a magnetic induction-based communication protocol such as near-field communication (NFC).

The external device 400 may be any form of device that is remote to the electronics module 300. The external device 400 may be any form of user electronic device such as a mobile device, e.g. a mobile phone. The external device 400 may be a tablet computer, another wearable device such as a smart watch. The external device 400 in FIG. 12 is a smartphone.

The electronics module 300 comprises an interface 301. The interface 301 may comprise the contact pads 301 of the electronics module 300 of FIGS. 4 and 5.

The electronics module 300 comprises a processor 303. The processor 303 may comprise a plurality of processors 303. The plurality of processors 303 may be distributed within different components of the electronics module 303. The processor 303 may comprise, for example, a single-interface processor module (e.g. an analog front-end) and a central processing module.

The processor 303 is communicatively coupled to interface 301 and is operable to receive biosignals via the interface 301. The processor 303 is configured to process received biosignals and other data.

The processor 303 is operable to measure the electrical property of an electrical connection formed between the two contacts 301 so as to read identification information encoded in a length of conductive material of a wearable article.

The electronics module 300 comprises a memory 305. The memory 305 is operable to store sensor data. The memory 305 may comprises a buffer in which the sensor data is temporarily stored. The buffer may be a first-in first-out buffer.

The electronics module 300 comprises a communicator 307 operable to transmit data. The communicator 307 is operable to wirelessly transmit data over one or more wireless communication protocols.

The communicator 307 of FIG. 12 comprises a first communicator represented by first antenna 309 and a second communicator represented by second antenna 311. The first antenna 309 in this example is used in magnetic induction-based communication with the external device 400. The magnetic induction-based communication may be a Near Field Communication (NFC) protocol. The second antenna 311 in this example is useable to transmit data such as sensor data. The second antenna 311 may use any wireless communication protocol. Particular examples include a Bluetooth® communication protocol or a WiFi® communication protocol. Generally, the communicator 307 provides wireless communication capabilities for the wearable article and enables the wearable article to communicate via one or more wireless communication protocols such as used for communication over: a wireless wide area network (WWAN), a wireless metroarea network (WMAN), a wireless local area network (WLAN), a wireless personal area network (WPAN), Bluetooth® Low Energy, Bluetooth® Mesh, Bluetooth® 5, Thread, Zigbee, IEEE 802.15.4, Ant, Ant+ a near field communication (NFC), a Global Navigation Satellite System (GNSS), a cellular communication network, or any other electromagnetic RF communication protocol. The cellular communication network may be a fourth generation (4G) LTE, LTE Advanced (LTE-A), LTE Cat-M1, LTE Cat-M2, NB-IoT, fifth generation (5G), sixth generation (6G), and/or any other present or future developed cellular wireless network. A plurality of communicators may be provided for communicating over a combination of different communication protocols.

The electronics module 300 further comprises a sensor 313. The sensor 313 may comprise any form of sensor arrangement to monitor properties of a user wearing the electronics module 300 or an environment external to the user. The sensor 313 may be selectively activated or otherwise configured by the processor 303 according to the read wearable article identifier.

The sensor 313 may comprise a temperature sensor. The temperature sensor may be arranged to monitor a core body temperature, ambient temperature, or skin-surface temperature of the user. The temperature sensor may be a contact temperature sensor or a non-contact temperature sensor such as an infrared thermometer. Example contact temperature sensors include thermocouples and thermistors.

The electronics module 300 may comprise any other form of sensor such as to monitor the property of the user or the environment around the user. The sensor may comprise an altitude sensor, presence sensor, or air quality sensor. The presence sensor may for detecting a touch input from a user. The presence sensor may comprise one or more of a capacitive sensor, inductive sensor, and ultrasonic sensor. Other examples of sensor are provided throughout this specification. The sensor may be, for example, a humidity sensor arranged to monitor a hydration or sweat level of the user. The sensor 313 may comprise a location tracking sensor such as a GNSS receiver.

The sensor 313 may comprise a motion sensor 313. The motion sensor 313 may comprise an inertial measurement unit 313. The inertial measurement unit 313 may comprise an accelerometer and optionally one or both of a gyroscope and a magnetometer. A gyroscope/magnetometer is not required in all examples, and instead only an accelerometer may be provided, or a gyroscope/magnetometer may be present but put into a low power state. A processor of the sensor 313 may perform processing tasks to classify different types of detected motion. The processor of the sensor 313 may, in particular, perform machine-learning functions so as to perform this classification. Performing the processing operations on the sensor 313 rather than the processor 303 is beneficial as it reduces power consumption and leaves the processor 303 free to perform other tasks. In addition, it allows for motion events to be detected even when the processor 303 is operating in a low power mode. The sensor 111 communicates with the processor 303 over a serial protocol such as the Serial Peripheral Interface (SPI), Inter-Integrated Circuit (I2C), Controller Area Network (CAN), and Recommended Standard 232 (RS-232). Other serial protocols are within the scope of the present disclosure. The processor 303 may send instructions to the sensor 313 to control the machine-learning operations performed based on the reading of the wearable article identifier.

The electronics module 300 further comprises a power source 315. The power source 315 is coupled to the processor 303 and is arranged to supply power to the processor 303. The power source 315 may comprise a plurality of power sources. The power source 315 may be a battery. The battery may be a rechargeable battery. The battery may be a rechargeable battery adapted to be charged wirelessly such as by inductive charging. The power source 315 may comprise an energy harvesting device. The energy harvesting device may be configured to generate electric power signals in response to kinetic events such as kinetic events performed by a wearer of the wearable article. The kinetic event could include walking, running, exercising or respiration of the wearer. The energy harvesting material may comprise a piezoelectric material which generates electricity in response to mechanical deformation of the converter. The energy harvesting device may harvest energy from body heat of a wearer of the wearable article. The energy harvesting device may be a thermoelectric energy harvesting device. The power source may be a super capacitor, or an energy cell.

The electronics module 300 may comprise a Universal Integrated Circuit Card (UICC) that enables the electronics module 300 to access services provided by a mobile network operator (MNO) or virtual mobile network operator (VMNO). The UICC may include at least a read-only memory (ROM) configured to store an MNO/VMNO profile that the wearable article can utilize to register and interact with an MNO/VMNO. The UICC may be in the form of a Subscriber Identity Module (SIM) card. The electronics module 100 may have a receiving section arranged to receive the SIM card. In other examples, the UICC is embedded directly into a controller of the electronics module 100. That is, the UICC may be an electronic/embedded UICC (eUICC). A eUICC is beneficial as it removes the need to store a number of MNO profiles, i.e. electronic Subscriber Identity Modules (eSIMs). Moreover, eSIMs can be remotely provisioned to electronics modules 300. The electronics modules 100 may comprise a secure element that represents an embedded Universal Integrated Circuit Card (eUICC).

Figure 13:
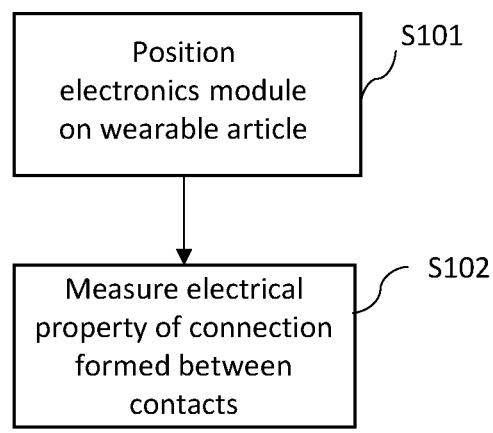
FIG. 13 shows a process flow diagram for an example method according to aspects of the present disclosure.

Referring to FIG. 13, there is shown a method of identifying a wearable article according to aspects of the present disclosure.

Step S101 of the method comprises positioning an electronics module on a wearable article such that two contacts of the electronics module are brought into contact with the identification element and electrically connected to one another via the identification element.

Step S102 of the method comprises measuring an electrical property of the electrical connection formed between the two contacts by the identification element so as to read identification information that is encoded into the electrical property of identification element.

The present disclosure is not limited to wearable assemblies and wearable articles. The technologies are useable in non-wearable applications. In other words, the present disclosure also provides an assembly comprising an article comprising an identification element, wherein identification information is encoded in an electrical property of identification element. The assembly further comprises an electronics module comprising a processor and two contacts communicatively coupled to the processor, the processor being operable to process signals received from the two contacts. When the electronics module is positioned on the article such that the two contacts are brought into contact with the identification element and electrically connected to one another via the identification element, the processor is operable to measure an electrical property of the electrical connection formed between the two contacts by the identification element so as to read the identification information.

In an example use case, the article may be an article of packaging. The electronics module may be stored in the packaging until it is shipped or otherwise purchased by the end user. While the electronics module is positioned in the packaging, the two contacts of the electronics module are brought into contact with an identification element of the packaging. The identification element identifies that the electronics module is positioned in packaging such as by having a characteristics resistance (e.g. of 500 to 550 Ohms). As a result of reading the identification element, the electronics module determines that it is in packaging, the electronics module configures itself to enter a deep sleep (e.g. a shipment mode). The electronics module may only wake up from the deep sleep state once the packaging is opened by the end user and power is supplied to the electronics module such as by inserting a USB cable into the packaging. The packaging may be for example a carry case for the electronics module which may be used to temporarily deactivate the electronics module such as when the user is on a flight. In other words, the identification element included in the packaging triggers the electronics module to enter a flight mode.

In an example use case, the article may be a backpack. A backpack is a form of wearable article as it may be worn by a user. The identification element may be positioned on the backpack such as on a strap of the backpack. The position of the identification element may be at a location which is optimal for GPS or similar location tracking signals. When positioned on the backpack such that the electronics module is able to read the identification element, the electronics module is able to configure itself for GPS reception. This may be useful in orienteering applications.

In the present disclosure, the electronics module may also be referred to as an electronics device or unit. These terms may be used interchangeably.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A wearable assembly comprising:
 a wearable article comprising an identification element, wherein identification information is encoded in an electrical property of the identification element; and
 an electronics module comprising a processor and two contacts communicatively coupled to the processor, the processor being operable to process signals received from the two contacts,
 wherein the electrical property is impedance, and when the electronics module is positioned on the wearable article such that the two contacts are brought into contact with the identification element and electrically connected to one another via the identification element, the processor is operable to measure the impedance of the electrical connection formed between the two contacts by the identification element so as to read the identification information.

2. The wearable assembly according to claim 1, wherein the identification element comprises a length of conductive material.

3. The wearable assembly according to claim 1, wherein the impedance is defined by one or more of the width, length, thickness, and resistivity of the conductive material that extends between and electrically connects the two contacts together.

4. The wearable assembly according to claim 2, wherein the length of conductive material comprises a region of uninterrupted, continuous, conductive material having a length at least equal to the spacing between the two contacts of the electronics module.

5. The wearable assembly according to claim 1, wherein the identification information identifies one or more of a property of the wearable article and a location of the identification element on the wearable article.

6. The wearable assembly according to claim 1, wherein the processor is operable to compare the impedance to one or more pre-stored values associated with different identification information so as to decode the identification information encoded in the impedance of the identification element.

7. The wearable assembly according to claim 1, wherein the wearable article comprises an interface for releasable mechanical connection to an electronics module, wherein when the electronics module is mechanically connected to the wearable article at the interface, the two contacts are brought into contact with the identification element such that the two contacts are electrically connected to one another via the identification element.

8. The wearable assembly according to claim 1, wherein the processor is operable to change a power mode of the electronics module according to the read identification information.

9. The wearable assembly according to claim 1, wherein the processor is operable to disable or enable one or more components associated with the electronics module according to the read identification information.

10. The wearable assembly according to claim 9, wherein the processor is operable to disable one or more components associated with processing signals received via the contacts according to the read identification information.

11. The wearable assembly according to claim 1, wherein the processor is operable to disable or enable one or more algorithms for processing sensor data according to the read identification information.

12. The wearable assembly according to claim 1, wherein the processor is operable to increase or decrease a sampling rate according to the read identification information.

13. The wearable assembly according to claim 1, wherein the processor is operable to enable or disable one or more communication channels for transmitting data according to the read identification information.

14. The wearable assembly according to claim 1, wherein the processor is operable to increase or decrease a buffer size in a memory for storing data according to the read identification information.

15. The wearable assembly according to claim 1, wherein the processor is operable to adjust one or more coefficients used in a machine-learning algorithm according to the read identification information.

16. The wearable assembly according to claim 1, wherein the processor is operable to select a machine-learning model for use in generating inferences according to the read identification information.

17. An electronics module for a wearable article, the electronics module comprising:
a processor and at least two contacts communicatively coupled to the processor, the two contacts are arranged to be brought into contact with an identification element when positioned on the wearable article,
wherein when the electronics module is positioned on the wearable article, the two contacts are electrically connected to one another via the identification element, and wherein the processor is operable to measure impedance of the electrical connection formed between the two contacts by the identification element so as to read identification information that is encoded into the impedance of the identification element.

18. The electronics module according to claim 17, wherein the electronics module is arranged to be mechanically connected to the wearable article at an interface of the wearable article.

19. A method of identifying a wearable article, the method comprises:
positioning an electronics module on a wearable article such that two contacts of the electronics module are brought into contact with an identification element of the wearable article and electrically connected to one another via the identification element; and
measuring impedance of the electrical connection formed between the two contacts by the identification element so as to read identification information that is encoded into the impedance of the identification element.

* * * * *